(12) United States Patent
Michenthaler et al.

(10) Patent No.: US 11,991,062 B2
(45) Date of Patent: May 21, 2024

(54) ADAPTATION TO A PULSE WIDTH MODULATION FREQUENCY VARIATION FOR A SENSOR OPERATING IN A SYNCHRONOUS MODE

(71) Applicant: Infineon Technologies AG, Neubiberg (DE)

(72) Inventors: Christof Michenthaler, Feistritz/Gail (AT); Thomas Hafner, Klagenfurt (AT); Benjamin Kollmitzer, Pörtschach (AT); Alexander Plautz, Ossich (AT); Andrea Possemato, Villach (AT); Constantin Stroi, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 289 days.

(21) Appl. No.: 17/451,168

(22) Filed: Oct. 18, 2021

(65) Prior Publication Data

US 2023/0125037 A1   Apr. 20, 2023

(51) Int. Cl.
*H04L 43/08* (2022.01)
*H04L 25/49* (2006.01)
*H04L 43/0852* (2022.01)
*H04L 67/12* (2022.01)

(52) U.S. Cl.
CPC ...... *H04L 43/0852* (2013.01); *H04L 25/4902* (2013.01); *H04L 67/12* (2013.01)

(58) Field of Classification Search
CPC .. H04L 43/0852; H04L 25/4902; H04L 67/12
See application file for complete search history.

(56) References Cited

U.S. PATENT DOCUMENTS

| | | | | |
|---|---|---|---|---|
| 4,733,104 A | * | 3/1988 | Steigerwald | H02M 3/33561 327/176 |
| 5,589,805 A | * | 12/1996 | Zuraski | H03K 7/08 318/599 |
| 6,101,106 A | * | 8/2000 | Shi | H02M 3/33515 323/284 |
| 6,867,645 B1 | * | 3/2005 | Ansari | H02P 7/04 327/423 |
| 10,581,543 B2 | * | 3/2020 | Aichriedler | H04Q 9/04 |

OTHER PUBLICATIONS

Extended European Search Report for Application No. EP22194559.5, dated Mar. 14, 2023, 9 pages.

* cited by examiner

*Primary Examiner* — Brenda H Pham
(74) *Attorney, Agent, or Firm* — Harrity & Harrity, LLP

(57) ABSTRACT

In some implementations, a sensor may determine a delay latency value associated with an amount of time from completion of a set of sensor tasks to an actual time of reception of a trigger to selectively transmit or sample sensor data. The sensor may calculate a deviation of the delay latency value from a target delay latency. The sensor may transmit a data frame including an indication associated with the deviation of the delay latency value from the target delay latency.

7 Claims, 16 Drawing Sheets

| cycle | $T_{rms}$ | Δt | Absolute time | Unit |
|---|---|---|---|---|
| 1 | 100 | | 100 | μs |
| 2 | 97.6 | 2.4 | 197.6 | μs |
| 3 | 95.2 | 2.4 | 292.8 | μs |
| 4 | 92.8 | 2.4 | 385.6 | μs |
| 5 | 90.4 | 2.4 | 476 | μs |
| 6 | 88 | 2.4 | 564 | μs |
| 7 | 85.6 | 2.4 | 649.6 | μs |
| 8 | 83.2 | 2.4 | 732.8 | μs |

800

ADAPTATION TO A PULSE WIDTH MODULATION FREQUENCY VARIATION FOR A SENSOR OPERATING IN A SYNCHRONOUS MODE

BACKGROUND

In some sensor systems, one or more sensors may be configured for operating in a synchronously. Generally, while operating synchronously, a sensor is to predict a time point at which a trigger from an electronic control unit (ECU) will be received, and is to perform a set of sensor tasks based on the prediction so that the sensor data for transmission is ready at the time point of receiving the trigger.

SUMMARY

In some implementations, a sensor includes one or more components to determine a time interval between a time of reception of a first trigger to selectively transmit or sample first sensor data and a time of reception of a second trigger to selectively transmit or sample second sensor data; determine, based on the time interval, a predicted time of reception of a third trigger to selectively transmit or sample third sensor data; initiate a set of sensor tasks based on the predicted time of reception of the third trigger, the set of sensor tasks being initiated to cause the third sensor data to be ready for transmission at the predicted time of reception of the third trigger; receive the third trigger; determine a delay latency value associated with an amount of time from completion of the set of sensor tasks to an actual time of reception of the third trigger; calculate a deviation of the delay latency value from a target delay latency; and transmit a data frame including an indication associated with the deviation of the delay latency value from the target delay latency.

In some implementations, a sensor includes a sensor algorithm component; and an interface implementation component, comprising: an internal trigger generator to: monitor a counter value, and trigger the sensor algorithm component to perform a set of sensor tasks based on a determination that the counter value is greater than or equal to an internal trigger level value; a trigger detector to: receive a trigger to selectively transmit or sample the sensor data, and forward the trigger to a trigger level calculator and a protocol encoder; the protocol encoder to transmit a data frame based at least in part on receiving the trigger; and the trigger level calculator to: determine an adjusted internal trigger level value, and provide the adjusted internal trigger level value to the internal trigger generator.

In some implementations, a method includes determining, by a sensor, a delay latency value associated with an amount of time from completion of a set of sensor tasks to an actual time of reception of a trigger to selectively transmit or sample sensor data; calculating, by the sensor, a deviation of the delay latency value from a target delay latency; and transmitting, by the sensor, a data frame including an indication associated with the deviation of the delay latency value from the target delay latency.

In some implementations, a method includes transmitting a first plurality of triggers to a sensor operating in a synchronous mode, wherein a time interval between triggers of the first plurality of triggers is a first period that corresponds to a first frequency; transmitting a second plurality of triggers to the sensor operating in the synchronous mode, wherein a time interval between triggers in the second plurality of triggers is a second period that corresponds to one-half of a second frequency, wherein the second frequency is higher than the first frequency; and transmitting a third plurality of triggers to the sensor operating in the synchronous mode, wherein a time interval between triggers in the third plurality of triggers is a third period that corresponds to the second frequency.

DETAILED DESCRIPTION

Figure 1:
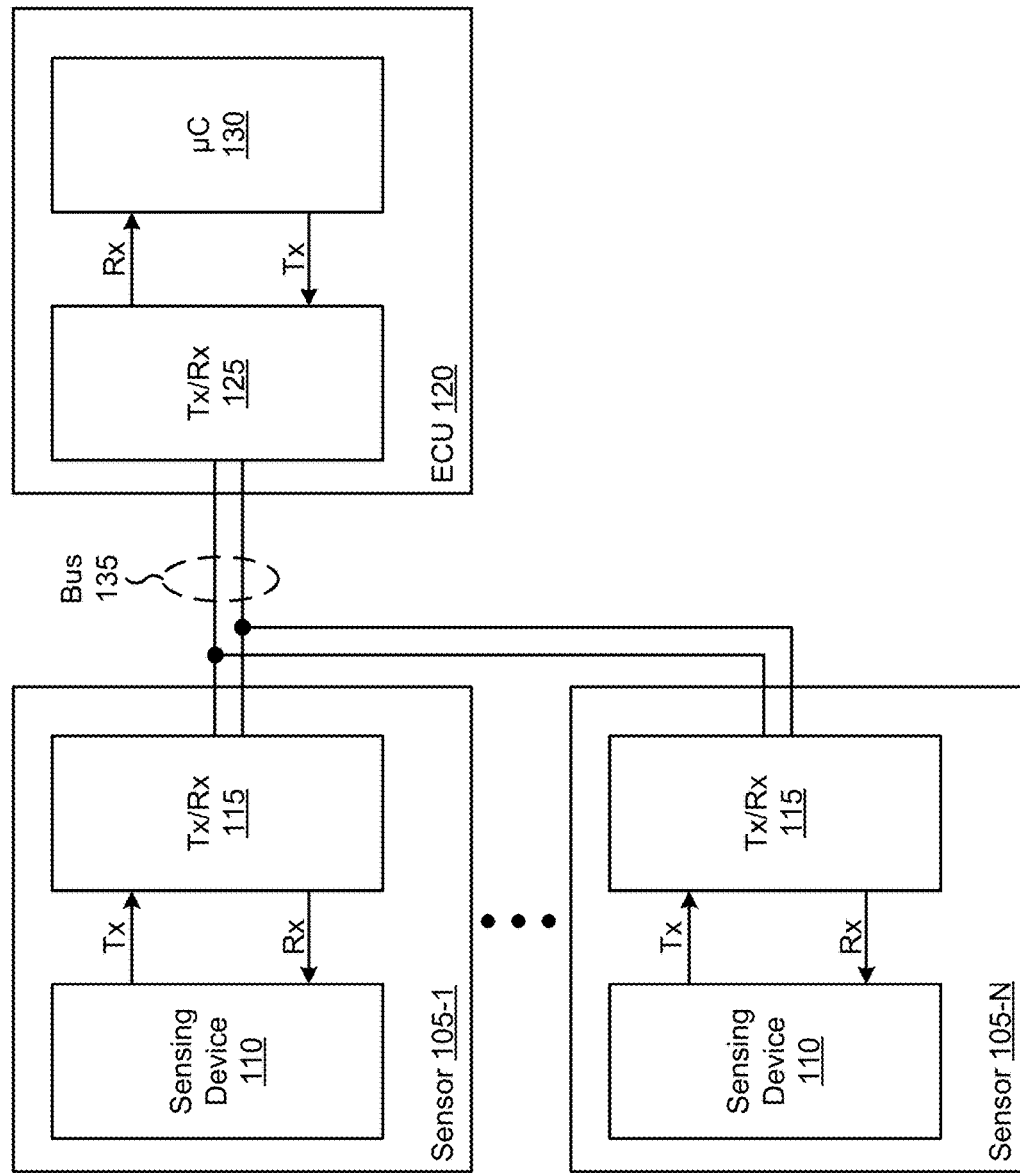
FIG. 1 is a diagram of an example sensor system in which techniques and apparatuses described herein may be implemented.

The following detailed description of example implementations refers to the accompanying drawings. The same reference numbers in different drawings may identify the same or similar elements.

In some sensor systems, one or more sensors may be configured for operation in a mode in which the sensor performs a set of sensor tasks based on receiving a trigger. Such a mode is referred to as an on-demand mode. Generally, while operating in the on-demand mode, a sensor performs a set of sensor tasks, such as sampling a sensor signal, calculating sensor data based on sampling the sensor signal, transmitting the sensor data, or the like, in response to receiving a trigger (e.g., a request for sensor data) received from an electronic control unit (ECU) of the sensor system. One disadvantage of the on-demand mode is that a delay between a trigger being transmitted by the ECU and sensor data responsive to the trigger being received by the ECU may be undesirably long (e.g., because the ECU has to wait for an internal processing time of the sensor in addition to a bus transmission time before receiving the sensor data) and that this delay might further be subject to significant jitter (e.g., because the ECU trigger frequency differs from the internal processing frequency of the sensor). This delay and jitter in the on-demand mode is not acceptable in some applications, such as applications that use a pulse width modulation (PWM) frequency of 20 kilohertz (kHz) or higher, because sensor data values will be missed during operation.

To reduce such delays in a sensor system, one or more sensors may be configured for operation in a synchronous mode. Generally, while operating in the synchronous mode, a sensor predicts a time point at which a trigger from the ECU will be received and performs a set of sensor tasks based on the prediction (e.g., such that the sensor preprocesses the sensor data) so that the sensor data is ready at the time point of receiving the trigger. The prediction therefore allows the sensor data to be transmitted to the ECU immediately upon receipt of the trigger (i.e., without a delay caused by internal sensor processing time, as occurs in the on-demand mode). However, a precondition for effective operation in the synchronous mode is a deterministic trigger being transmitted by the ECU (e.g., to allow the sensor to accurately predict a time point of reception of a trigger) and to have minimal jitter of the predicted time point to avoid additional errors caused by the jitter.

In some applications, an ECU of a sensor system can vary a PWM frequency as part of a strategy for controlling the sensor system. Notably, PWM frequency variation does not impact performance of the sensor system while sensors are operating in an on-demand mode. However, PWM frequency variation leads to a non-deterministic trigger behavior for the sensor system and, therefore, degrades performance of the sensor system when one or more sensors are operating in the synchronous mode.

Some implementations described herein provide techniques and apparatuses for adaptation to a PWM frequency variation in a sensor system comprising one or more sensors operating in a synchronous mode.

In some implementations, as described herein, a sensor operating in a synchronous mode may be capable of adjusting a sampling point (e.g., a time point at which a sensor signal is sampled) to account for a variation of a PWM frequency. For example, in some implementations, the sampling point can be adjusted incrementally (e.g., at a configurable increment, within a configurable window, or the like) to adapt to the PWM frequency variation, thereby allowing the sensor to adapt to the PWM frequency variation without a loss of sensor data values. Additionally, in some implementations, the sensor may determine and transmit latency compensation information (e.g., an indication of a delay time between completion of a set of sensor tasks and reception of a trigger from the ECU, information indicating a deviation from an expected sampling point, or the like), thereby enabling the ECU to compensate for latency without any additional jitter.

In some implementations, as described herein, a sensor operating in the synchronous mode may be capable of configuring prediction of a trigger point (e.g., a time point at which a trigger is received from the ECU). In some implementations, the prediction of the trigger point can be configured so as to account for a variation in a PWM frequency. For example, in some implementations, the sensor may measure an amount of time between consecutive triggers received by the sensor. Here, upon receipt of a given trigger, the sensor may adjust a reference time associated with predicting receipt of triggers from the ECU. In some implementations, the repetitive or continuous update of the reference time enables the sensor to adapt to a PWM frequency change while maintaining synchronization during operation in the synchronous mode.

In some implementations, as described herein, an ECU may be configured to temporarily increase a PWM frequency above a target PWM frequency, after which the ECU may decrease the PWM frequency to the target PWM frequency. In some implementations, the temporary overincrease of the PWM frequency prevents a sensor operating in the synchronous mode from missing sensor data values that could otherwise result from an increase directly to the target PWM frequency. Additional details regarding the above-described implementations are provided below.

FIG. 1 is a diagram of an example sensor system 100 in which techniques and apparatuses described herein may be implemented. As shown in FIG. 1, sensor system 100 may include one or more sensors 105 (e.g., sensors 105-1 through 105-N (N≥1)) connected to an ECU 120 via a sensor interface bus 135 (herein referred to as bus 135).

A sensor 105 includes a housing associated with one or more components of a sensor for measuring one or more characteristics (e.g., a speed of an object, a position of an object, an angle of rotation of an object, an amount of pressure, a temperature, an amount of current, and/or the like). As shown, the sensor 105 includes a sensing device 110 and a transceiver (Tx/Rx) 115. In some implementations, the sensor 105 is remote from the ECU 120 and, thus, is connected to the ECU 120 via the bus 135 (e.g., via a wired connection). Additionally, or alternatively, the sensor 105 may be a local sensor (e.g., such that the sensor 105 is connected to the ECU 120 via a short connection, is integrated with the ECU 120 on a same chip, and/or the like). In some implementations, the sensor 105 is capable of operation in a synchronous mode of operation, as described herein.

Sensing device 110 includes a device capable of performing a sensing function (e.g., sampling a sensor signal, calculating sensor data or otherwise determining sensor data based on sampling the sensor signal, or the like). In some implementations, sensing device 110 is capable of performing operations associated with adapting to a PWM frequency variation during operation in a synchronous mode, as described herein. In some implementations, sensing device 110 may include one or more sensing elements, an analog-to-digital converter (ADC), a digital signal processor (DSP), a memory component (e.g., a non-volatile memory), a digital interface, and/or one or more other components that enable performance of the sensing function and/or enable operations described herein.

Transceiver 115 includes a component via which a device (e.g., the sensor 105, the ECU 120) may transmit and receive information. For example, transceiver 115 may include a differential line transceiver, or a similar type of device. In some implementations, transceiver 115 includes a transmit (Tx) component that allows the sensor 105 to transmit information (e.g., sensor data, information related to the sensor data, latency compensation information, diagnostic information, or the like) to the ECU 120 via the bus 135, and a receive (Rx) component that allows the sensor 105 to receive information (e.g., trigger signals, read commands, or the like) from the ECU 120 via the bus 135. In some implementations, transceiver 115 may include a line driver for enabling the Tx component to transmit information or the Rx component to receive information at a given time. In some implementations, the sensor 105 may not include transceiver 115. For example, the sensor 105 may not include transceiver 115 when the sensor 105 is a local sensor and/or when a length of a connection between the sensor 105 and the ECU 120 is relatively short (e.g., as compared to an application where the sensor 105 is a remote sensor).

The bus 135 includes a sensor interface bus for carrying information between the one or more sensors 105 and the ECU 120. In some implementations, the bus 135 may comprise a connection (e.g., including one or more wires and connectors) via which the sensor 105 is connected to the ECU 120. In some implementations, the bus 135 may include a set of connections, each associated with one or more sensors 105 connected to the ECU 120 (e.g., when multiple sensors 105 are connected to the ECU 120 via one or more buses 115). In some implementations, a given connection may be capable of carrying a signal from the ECU 120 to the sensor 105 and carrying a signal from the sensor 105 to the ECU 120 (e.g., via a same wire or via a different wire).

The ECU 120 includes one or more devices associated with controlling one or more electrical systems and/or electrical subsystems based on sensor data provided by the sensor 105. As shown, the ECU 120 may include a transceiver 125 and a controller (µC) 130. In some implementations, controller 130 may be capable of calibrating, controlling, adjusting, or the like, the one or more electrical systems and/or electrical subsystems based on sensor data transmitted by the sensor 105. For example, in some implementations, controller 130 may include an electronic/engine control module (ECM), a powertrain control module (PCM), a transmission control module (TCM), a brake control module (BCM or EBCM), a central control module (CCM), a central timing module (CTM), a general electronic module (GEM), a body control module (BCM), a suspension control module (SCM), or another electrical system or electrical subsystem of a vehicle. In some implementations, the controller 130 may be capable of selecting, varying, or otherwise controlling a PWM frequency in association with obtaining sensor data from the one or more sensors 105 for use in controlling the one or more electrical systems and/or electrical subsystems.

Transceiver 125 may be similar to transceiver 115, and may include a component via which a device (e.g., the sensor 105, the ECU 120) may transmit and receive information. In some implementations, transceiver 125 includes a Tx component that allows the ECU 120 to transmit information (e.g., trigger signals) to the sensor 105 via the bus 135, and an Rx component that allows the ECU 120 to receive information (e.g., sensor data, diagnostic information, and/or the like) from the sensor 105 via the bus 135. In some implementations, transceiver 125 may include a line driver for enabling the Tx component to transmit information or the Rx component to receive information at a given time.

The number and arrangement of apparatuses shown in FIG. 1 is provided as an example. In practice, there may be additional devices and/or components, fewer devices and/or components, different devices and/or components, or differently arranged devices and/or components than those shown in FIG. 1. For example, in some implementations, sensor system 100 may include multiple sensors 105, each connected to the ECU 120 via one or more associated buses 115. Furthermore, two or more devices and/or components shown in FIG. 1 may be implemented within a single device and/or component, or a single device and/or a single component shown in FIG. 1 may be implemented as multiple, distributed devices and/or components. Additionally, or alternatively, a set of devices and/or components (e.g., one or more devices and/or components) of FIG. 1 may perform one or more functions described as being performed by another set of devices and/or components of FIG. 1.

Figure 2:
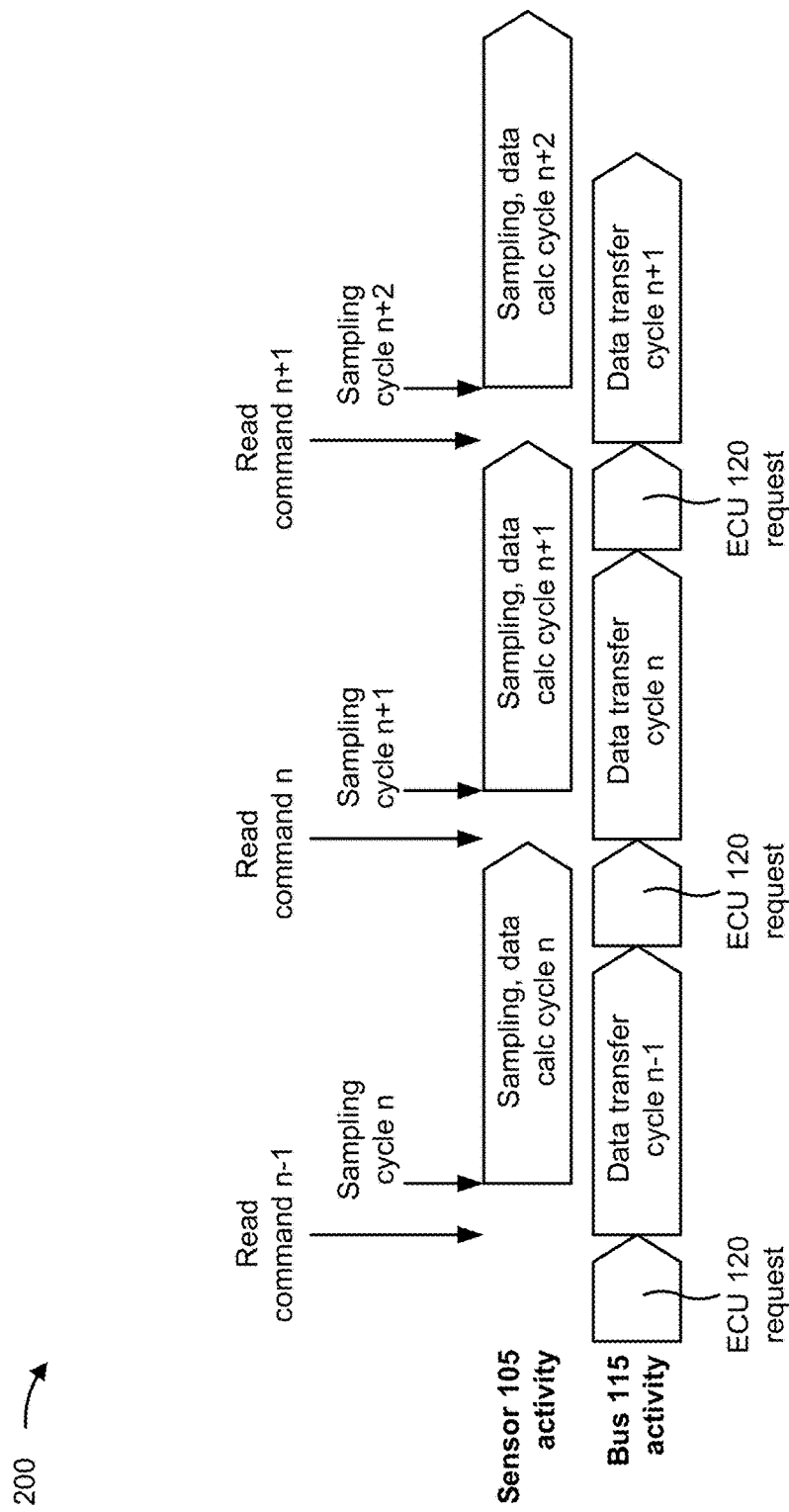
FIGS. 2 and 3 are diagrams associated with operation of a sensor in a synchronous mode, as described herein.
Figure 3:
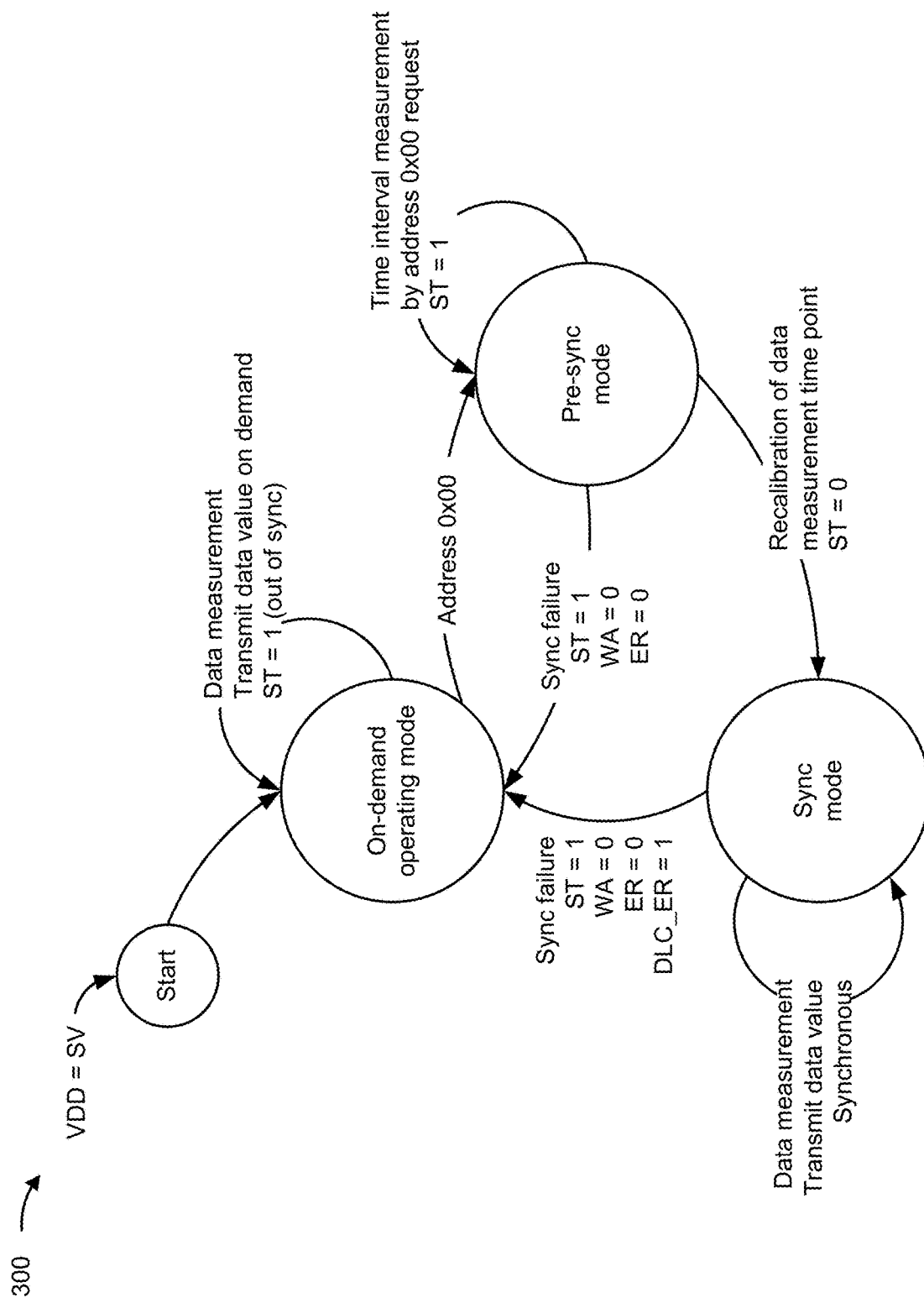

FIGS. 2 and 3 are diagrams associated with operation of a sensor 105 in a synchronous mode. In the synchronous mode of operation, as illustrated in example 200 of FIG. 2, for a given cycle, the sensor 105 initiates a set of sensor tasks (e.g., sensor signal sampling and calculation of sensor data) such that sensor data is ready for transmission at a time point at which a trigger is received by the sensor 105 (e.g., such that the sensor data is ready at a time point at which a read command is received in a request from the ECU 120 on the bus 135). As noted above, the synchronous mode of operation reduces latency time associated with reception of sensor data by the ECU 120 and, additionally, improves utilization of the bus 135 (e.g., when multiple sensors 105 are connected to the bus 135 or if multiple registers of one or more sensors 105 have to be read out within a given time frame). In some implementations, as described above and as indicated by FIG. 2, the sensor 105 in the synchronous mode is configured to predict reception of the trigger and, therefore, anticipates the time point at which to initiate the set of sensor tasks such that the sensor data is ready for transmission at the time point at which the sensor 105 receives the trigger. In some implementations, the sensor 105 may transmit, in a data frame comprising the sensor data, information indicating a status of this timing control loop (e.g., an indication of whether synchronization of the sensor 105 is maintained).

FIG. 3 is a flow chart 300 illustrating operations of the sensor 105 to initiate operation in the synchronous mode. As shown in FIG. 3, at start-up (e.g., when the sensor system 100 is powered on, the sensor 105 enters an on-demand mode of operation. In some implementations, the on-demand mode may be configured as a default mode of operation for the sensor 105. Here, if the synchronous mode is selected in a communication configuration register of the sensor 105, then the sensor 105 may initiate a sequence for commencing operation in the synchronous mode based on a first trigger being received from the ECU 120 (e.g., when the ECU 120 broadcasts the first trigger on the bus 135 to a designated address, such as address 0x00). Based on receiving the first trigger, the sensor 105 with the synchronous mode enabled initiates a time interval measurement and operation in a pre-synchronous mode, as shown in FIG. 3. Here, the sensor 105 may be configured to, in response to the first trigger, transmit most recent sensor data available on the sensor 105 along with an indication that the sensor 105 is out of synchronization (e.g., by indicating an out-of-sync condition in a status register). A second trigger broadcasted by the ECU 120 (e.g., to the designated address) enables the sensor 105 to measure the time interval between the first trigger and the second trigger. The time interval can then be used by the sensor 105 for predicting a time point at which the sensor 105 will receive a third trigger, and the sensor 105 can commence operation in the synchronous mode, accordingly. In some implementations, if the sensor 105 experiences a synchronization failure, the sensor 105 may return to the on-demand mode of operation and repeat the above-described steps in order to return to the synchronous mode of operation.

As indicated above, FIGS. 2 and 3 are provided as examples. Other examples may differ from what is described with regard to FIGS. 2 and 3.

Figure 4:
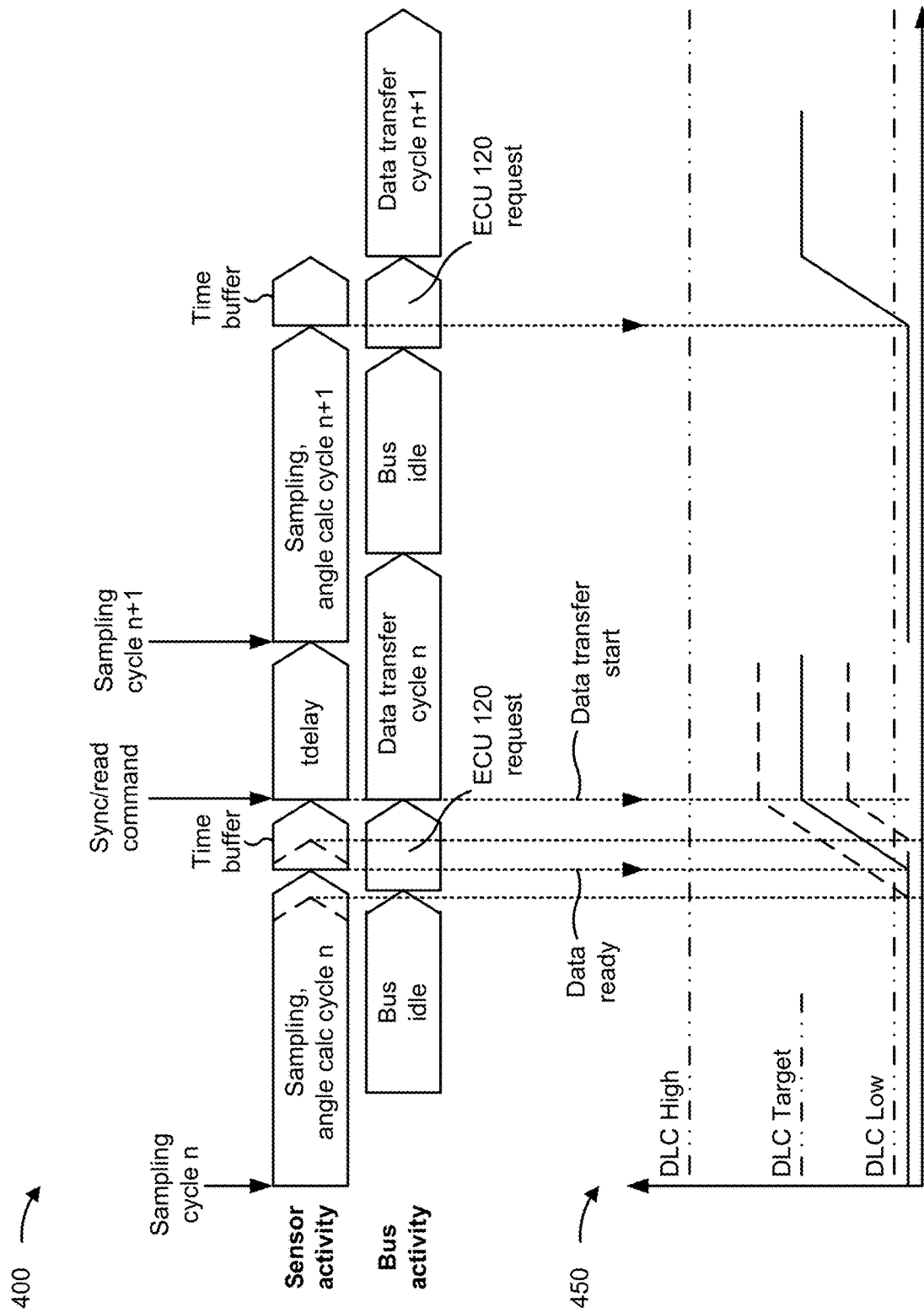
FIG. 4 is a timing diagram and a corresponding timeline associated with use of a delay latency counter (DLC) and a comparison of a DLC value to a DLC target, as described herein.

In some implementations, as described above, the sensor 105 may measure a time interval between triggers received from the ECU 120 and may predict timing of a next trigger based on the time interval in association with operating in the synchronous mode. In some implementations, the sensor 105 may be configured with a delay latency counter (DLC) to measure an amount of time between a time of completion of a set of sensor tasks (e.g., a time at which the sensor data is ready for transmission) and a time of reception of the next trigger (e.g., a next synchronization command, a next read command, or the like). FIG. 4 depicts a timing diagram 400 and a corresponding timeline 450 associated with use of the DLC and a comparison of a DLC value to a DLC target. In some implementations, the DLC can be used in association with adjusting a prediction of a time point at which upcoming triggers will be received by the sensor 105. In some implementations, as indicated in FIG. 4, the sensor 105 starts the DLC upon completion of the set of sensor tasks. As further indicated in FIG. 4, the sensor 105 may in some implementations stop the DLC upon reception of a next trigger (e.g., upon receiving a request from the ECU 120).

In some implementations, the sensor 105 compares the value of the DLC at the time of reception of the next trigger to a high DLC threshold (e.g., a maximum allowable DLC value). Here, if the value of the DLC is greater than or equal to the high DLC threshold, meaning that the trigger is received later than predicted by some (configurable) amount of time, then the sensor 105 may determine that the sensor data is expired. In such a case, the sensor 105 may transmit the data frame including the sensor data and an indication that the sensor data is expired. Similarly, the sensor 105 in some implementations compares the value of the DLC at the time of the receipt of the next trigger to a low DLC threshold (e.g., a minimum allowable DLC value). Here, if the value of the DLC is less than or equal to the DLC low threshold, meaning that the trigger is received before the sensor earlier than predicted by a configurable amount of time or even before the sensor data is ready for transmission, then the sensor 105 may transmit the data frame without including sensor data or, alternatively, may transmit the data frame including old sensor data along with an indication that the sensor data is not ready.

Figure 5:
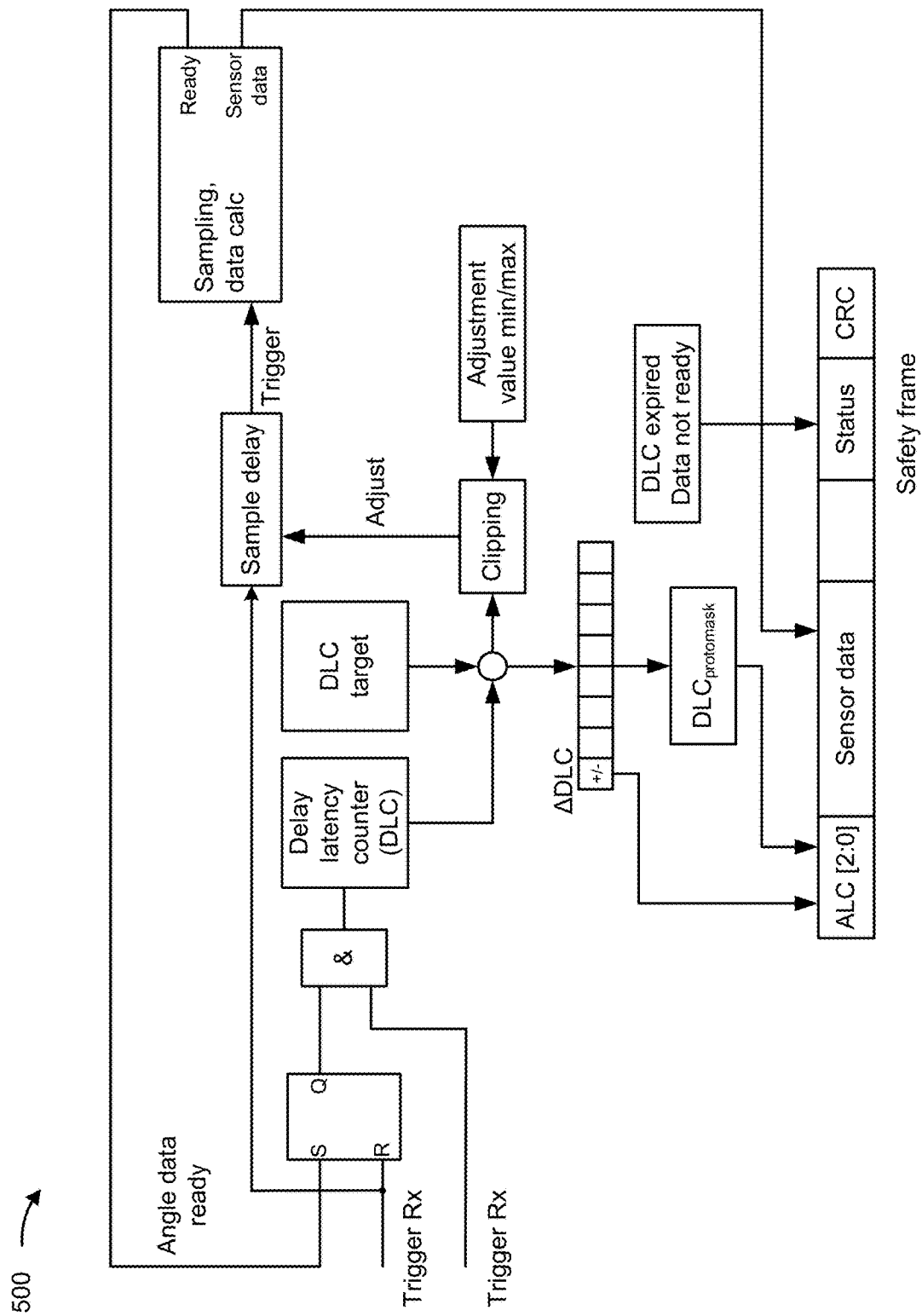
FIG. 5 is a diagram illustrating a schematic representation of an example implementation of a sensor capable of operating in the synchronous mode as described in association with FIG. 4.

Further, in some implementations, based on receiving the next trigger, the sensor 105 calculates a deviation of an actual delay latency (e.g., indicated by the value of the DLC at the time of receipt of the next trigger) from a target delay latency (e.g., a DLC target). In some implementations, the sensor 105 transmits an indication of the deviation from the target delay latency (referred to as latency compensation information), along with the sensor data, to the ECU 120. In some implementations, the latency compensation information may be carried in one or more bits of the data frame designated for advanced latency compensation (ALC) information. In this way, the ECU 120 may receive the sensor data and the latency compensation information and, therefore, may compensate for an unexpected delay latency associated with the sensor data. In some implementations, if the value of the DLC is greater than or equal to the DLC high threshold (e.g., when the next trigger was received later than anticipated) or is less than or equal to the DLC low threshold (e.g., when the sensor data is not ready upon receipt of the next trigger), then the sensor 105 may indicate the data frame transmitted by the sensor 105 as expired. FIG. 5 is a diagram illustrating a schematic representation of an example implementation 500 of the sensor 105 capable of operating in the synchronous mode as described in association with FIG. 4.

As indicated above, FIGS. 4 and 5 are provided as examples. Other examples may differ from what is described with regard to FIGS. 4 and 5.

In some implementations, the sensor 105 may compare a DLC value at a time point of reception of a trigger and a DLC target for reception of a trigger from the ECU 120. In some implementations, depending on a result of a given comparison, a sampling time point (e.g., a time point at which the sensor 105 samples the sensor signal) for a next cycle can be adjusted (e.g., by a configurable amount). In some implementations, adjustment of the sampling time point in this manner enables adaptation of the sensor 105 to clock drift or an intended change of PWM frequency, while avoiding a loss of synchronization.

Figure 6:
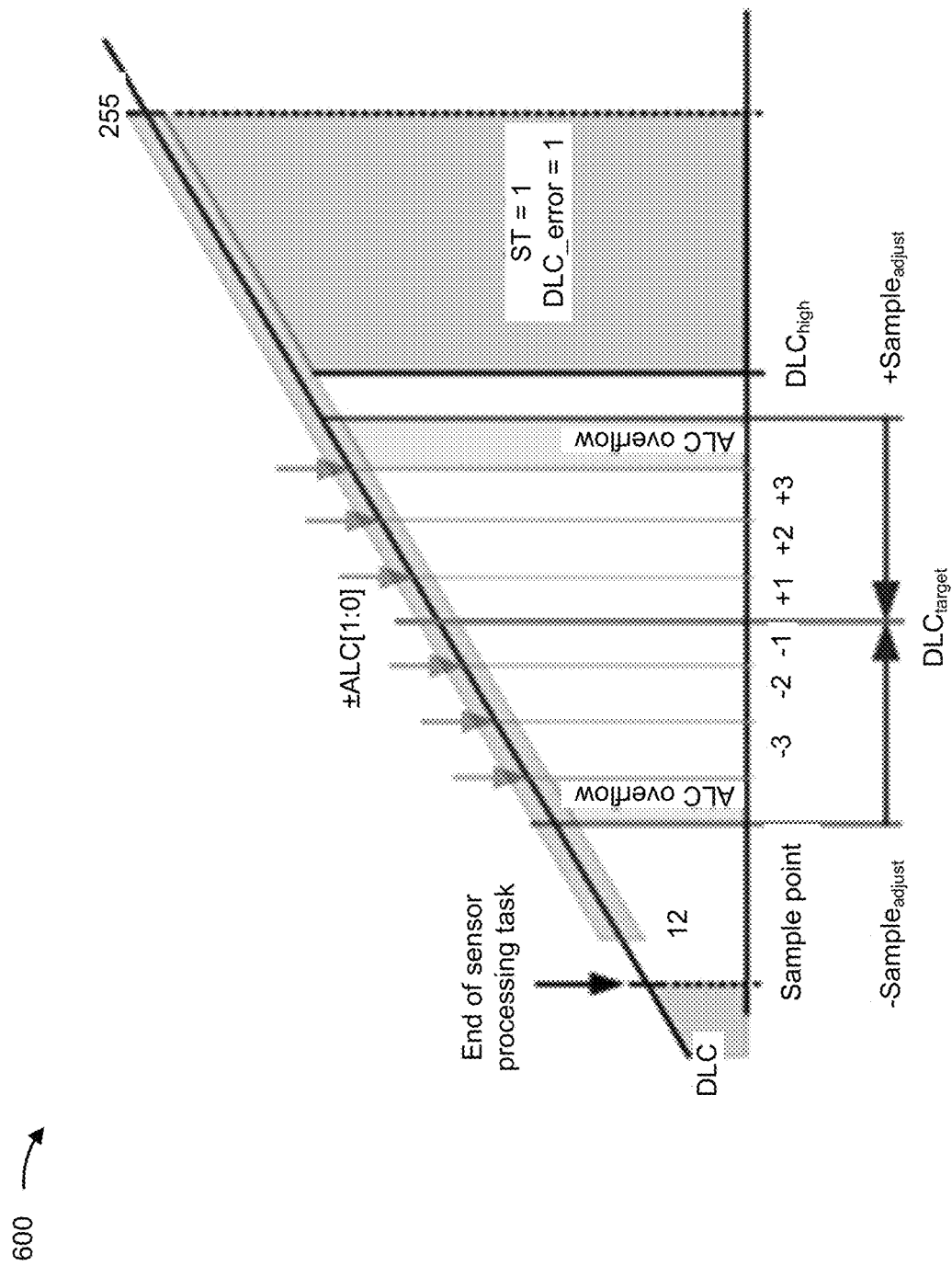
FIGS. 6 and 7 are diagrams illustrating examples associated with adjustment of a sampling point based on a DLC value and a DLC target, as described herein.
Figure 7:
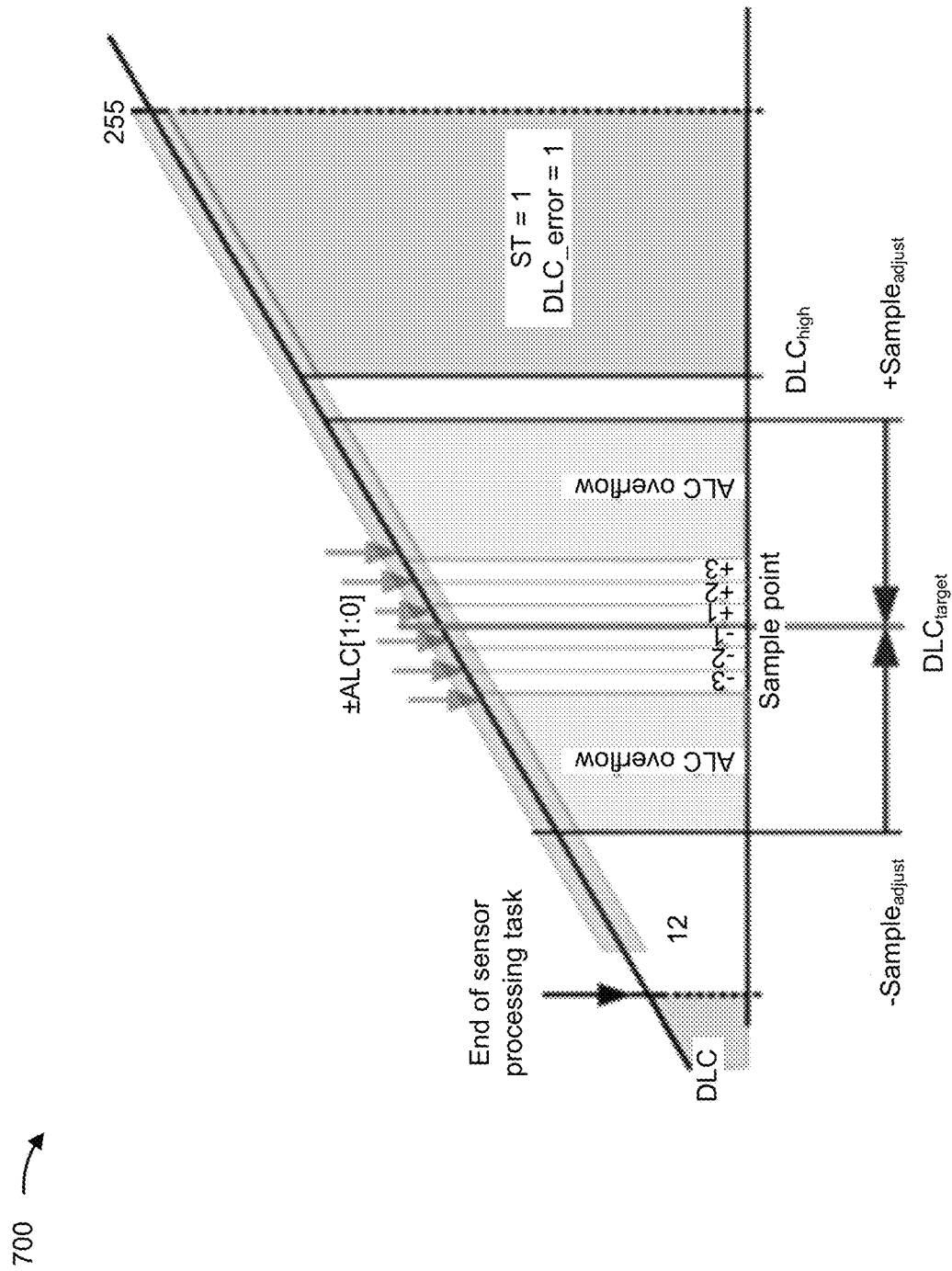

As indicated above, the DLC value indicates an amount of time between the completion of the set of sensor tasks (e.g., starting from a time of completion of calculation of the sensor data) and reception of a next trigger from the ECU 120. Ideally, timing of reception of the next trigger coincides with the DLC target, as described above. However, due to jitter effects, the time at which the trigger is received may deviate from the DLC target. In some implementations, the sensor 105 may indicate the deviation (e.g., a positive deviation or a negative deviation) of the DLC value from the DLC target in latency compensation information (e.g., by ALC information carried in one or more bits) transmitted in the data frame carrying the sensor data. In some implementations, the sensor 105 may adjust a sampling point (e.g., a time point at which the sensor 105 samples the sensor signal in a given cycle) based on the deviation of the DLC value from the DLC target. FIGS. 6 and 7 are diagrams illustrating examples 600 and 700, respectively, associated with adjustment of a sampling point based on a DLC value and a DLC target.

In some implementations, as illustrated in FIGS. 6 and 7, the sensor 105 may be configured with a sample adjustment value (Sample$_{adjust}$) that defines a sample adjustment range (e.g., a range between −Sample$_{adjust}$ and +Sample$_{adjust}$ as indicated in FIGS. 6 and 7). In some implementations, the sample adjustment value is configurable on the sensor 105. In operation, if the sensor 105 determines that the DLC value is outside of the sample adjustment range (i.e., that the deviation of the DLC value from the DLC target satisfies a sample adjustment threshold), then the sensor 105 may adjust the sampling point for the next cycle by a particular amount, such an amount of time corresponding to the configured sample adjustment value.

In some implementations, if the DLC value is greater than or equal to the DLC high threshold or is less than or equal to the DLC low threshold, then the data frame is considered expired and the sensor 105 may perform a resynchronization (e.g., over a next three cycles). In some implementations, a resolution of the ALC (e.g., a DLCprotoMask), a maximum for the sample adjustment value, the DLC target, and/or the DLC high threshold are configurable and, therefore, can be configured depending requirements in a given application.

FIG. 6 illustrates an example associated with adjusting and compensating for a comparatively larger deviation of the DLC value from the DLC target, while FIG. 7 illustrates an example associated with adjusting and compensating for a comparatively smaller deviation of the DLC value from the DLC target.

As indicated above, FIGS. 6 and 7 are provided as examples. Other examples may differ from what is described with regard to FIGS. 6 and 7.

In some implementations, the ECU 120 may vary the PWM frequency during operation of the sensor 105 in the synchronous mode, as described above. In some implementations, the sensor 105 may adapt to the variation in the PWM frequency without losing synchronization. In some implementations, a sample adjustment time based on which the sensor 105 can adapt to the frequency variation is configurable. In some implementations, the sample adjustment time is in a range between from, for example, 150 nanoseconds (ns) to 2.4 microseconds (μs).

In some implementations, with a variation in timing of the trigger (e.g., a difference between the DLC value and the DLC target) that is larger than the sample adjustment time, a sampling point associated with a next cycle is changed based on the sample adjustment time to support the PWM frequency change. This procedure can be repeated until the desired frequency has been reached. In some implementations, a speed at which the adjustment can be achieved depends on the sample adjustment time.

Figure 8:
FIG. 8 is a diagram illustrating an example of adaptation to a change in pulse width modulation (PWM) frequency based on a configurable sample adjustment time, as described herein.

FIG. 8 is a diagram illustrating an example 800 of adaptation to a change in PWM frequency based on a configurable sample adjustment time. In example 800, the PWM frequency is to be changed from 10 kilohertz (kHz) (corresponding to a period $T_{PWM}$ of 100 μs) to 12 kHz (corresponding to a period $T_{PWM}$ of 83.3 μs). In the example shown in FIG. 8, the sample adjustment time Δt is 2.4 μs. As shown in FIG. 8, the sensor 105 can adapt to the frequency variation from 10 kHz to 12 kHz over 8 cycles, which corresponds to 732.8 μs in absolute time. Notably, an ALC value in this example should cover a maximum PWM jitter (e.g., ±300 ns), and a DLC protocol mask should be set to a value which enables the maximum benefit for the prediction calculation in the ECU 120.

As indicated above, FIG. 8 is provided as an example. Other examples may differ from what is described with regard to FIG. 8.

In some implementations, as described above, the sensor 105 may predict a time point at which a next trigger is received based on measuring an amount of time between time points at which two received triggers are received. In some implementations, the sensor 105 may perform such measurements repeatedly in order to continuously update the time point at which to initiate performance of a set of sensor tasks. For example, the sensor 105 may maintain a reference time value based on measured time intervals between triggers, and may utilize the reference time value in association with predicting when the sensor 105 will receive a next trigger.

Figure 9:
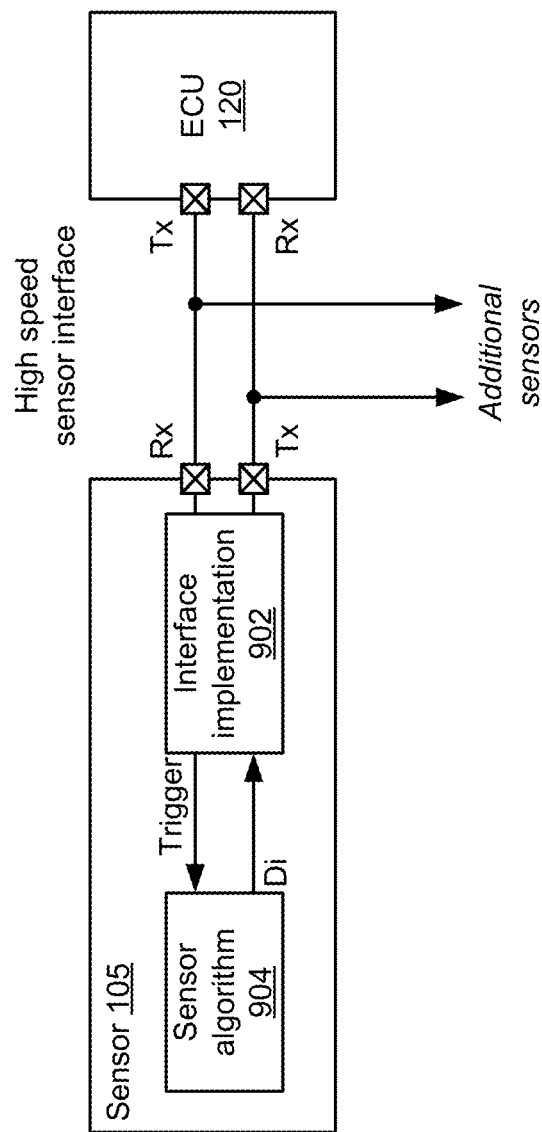
FIG. 9 is a diagram illustrating an example implementation for a sensor capable of performing operations associated with maintaining a reference time value in association with predicting time points of receiving triggers from an ECU, as described herein.

FIG. 9 is a diagram illustrating an example implementation for the sensor 105 capable of performing operations associated with maintaining a reference time value in association with predicting time points of receiving triggers from the ECU 120. As shown in FIG. 9, the sensor 105 may include an interface implementation component 902 and a sensor algorithm component 904. As shown, the interface implementation component 902 may be connected (e.g., via relevant circuitry, such as a Schmitt trigger, a pad driver, or the like) to input/output pins of the sensor 105 in order to enable communication with the ECU 120. As further shown, the interface implementation component 902 may also be connected to the sensor algorithm component 904 with at least an internal trigger wire and a sensor data interface (e.g., associated with transferring data values Di).

As indicated above, FIG. 9 is provided as an example. Other examples may differ from what is described with regard to FIG. 9.

Figure 10:
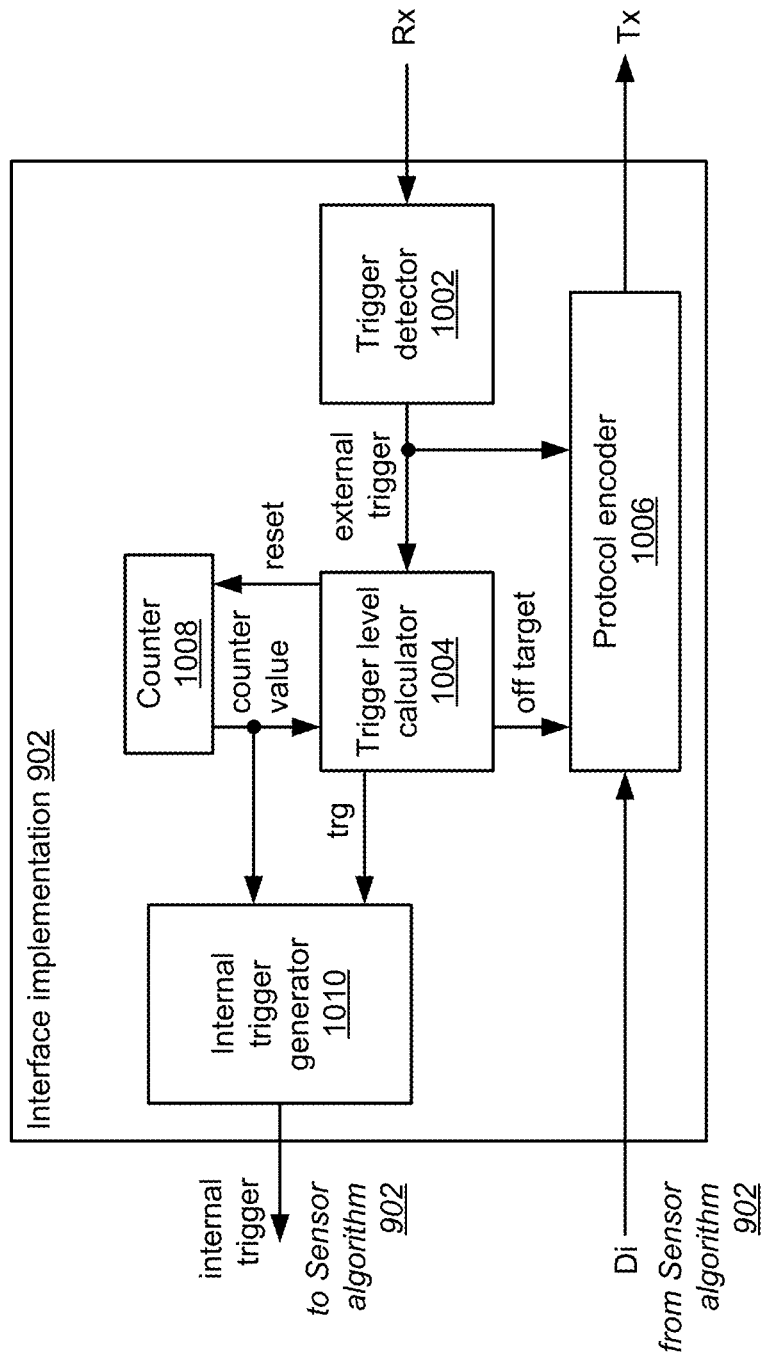
FIG. 10 is a diagram illustrating an example of the interface implementation component of the sensor shown in FIG. 9.

FIG. 10 is a diagram illustrating an example of the interface implementation component 902. As shown in FIG. 10, the interface implementation component 902 may include a trigger detector 1002, a trigger level calculator 1004, a protocol encoder 1006, a counter 1008, and an internal trigger generator 1010.

In an example operation, the trigger detector 1002 detects a trigger received from the ECU 120 and forwards an indication that a trigger was detected (e.g., external trigger signal) to the trigger level calculator 1004 and the protocol encoder 1006.

In some implementations, upon receiving the external trigger signal from the trigger detector 1002, the trigger level calculator 1004 obtains a counter value from the counter 1008 and resets the counter 1008. Next, the trigger level calculator 1004 may compare the counter value to a reference time value (e.g., by the trigger level calculator 1004). Here, if a difference between the counter value and the reference time value satisfies a threshold (e.g., the absolute value of the difference is greater than or equal to a threshold value), then the trigger level calculator 104 may signal the protocol encoder 1006 that the difference between the counter value and the reference time value satisfied the threshold (i.e., that the trigger was received "off target"). In some implementations, the trigger level calculator 1004 subtracts a DLC target value (e.g., stored or otherwise accessible by the trigger level calculator 1004) from the counter value, and stores a result of the subtraction as internal trigger level value (trg). In some implementations, the DLC target value corresponds to an amount of time needed for the sensor algorithm component 904 to perform a set of sensor tasks (e.g., plus a margin time used to accommodate, for example, jitter). In some implementations, the trigger level calculator 1004 provides the internal trigger level value to the internal trigger generator 1010. Notably, the counter 1008 counts from 0 and should be sufficiently dimensioned such that a maximum specified external trigger period without overflow can be supported.

In some implementations, as shown in FIG. 10, the internal trigger generator 1010 also monitors the counter value from the counter 1008. Here, the internal trigger generator 1010 triggers the sensor algorithm component 904 (e.g., via an internal trigger signal), when the counter value of the counter 1008 is greater than or equal to the internal trigger level value stored on the internal trigger generator 1010 (e.g., an internal trigger level value received from the trigger level calculator 1004 at an earlier time). Upon receiving the internal trigger signal from the internal trigger generator 1010, the sensor algorithm component 904 computes sensor data (Di). In some implementations, computation of the sensor data can include, for example, triggering analog-to-digital conversions, fetching data from ADCs, filters, or registers, compensating for sensor or ADC non-idealities (e.g., offset, amplitude, phase, orthogonality compensation, or the like), calculating related values (e.g., an angle or a linear position via, for example, an arctan function call, a CORDIC evaluation, or the like), or compensating the related value for non-idealities (e.g., using look-up table compensation), among other examples.

In some implementations, upon receiving the indication that the trigger from the ECU 120 was detected, the protocol encoder 1006 prepares and transmits a data frame to the ECU 120. Here, if no valid sensor data value Di has been received from the sensor algorithm 904, the lack of sensor data is indicated in the data frame (e.g., using a value such as "nd"). In a case in which the sensor data value Di is "off target"—as indicated by the trigger level calculator 1004 in the manner described above—this information is indicated in the data frame (e.g., a warning indicating that the delay of the sensor data is different than in the nominal case).

As indicated above, FIG. 10 is provided as an example. Other examples may differ from what is described with regard to FIG. 10.

Figure 11:
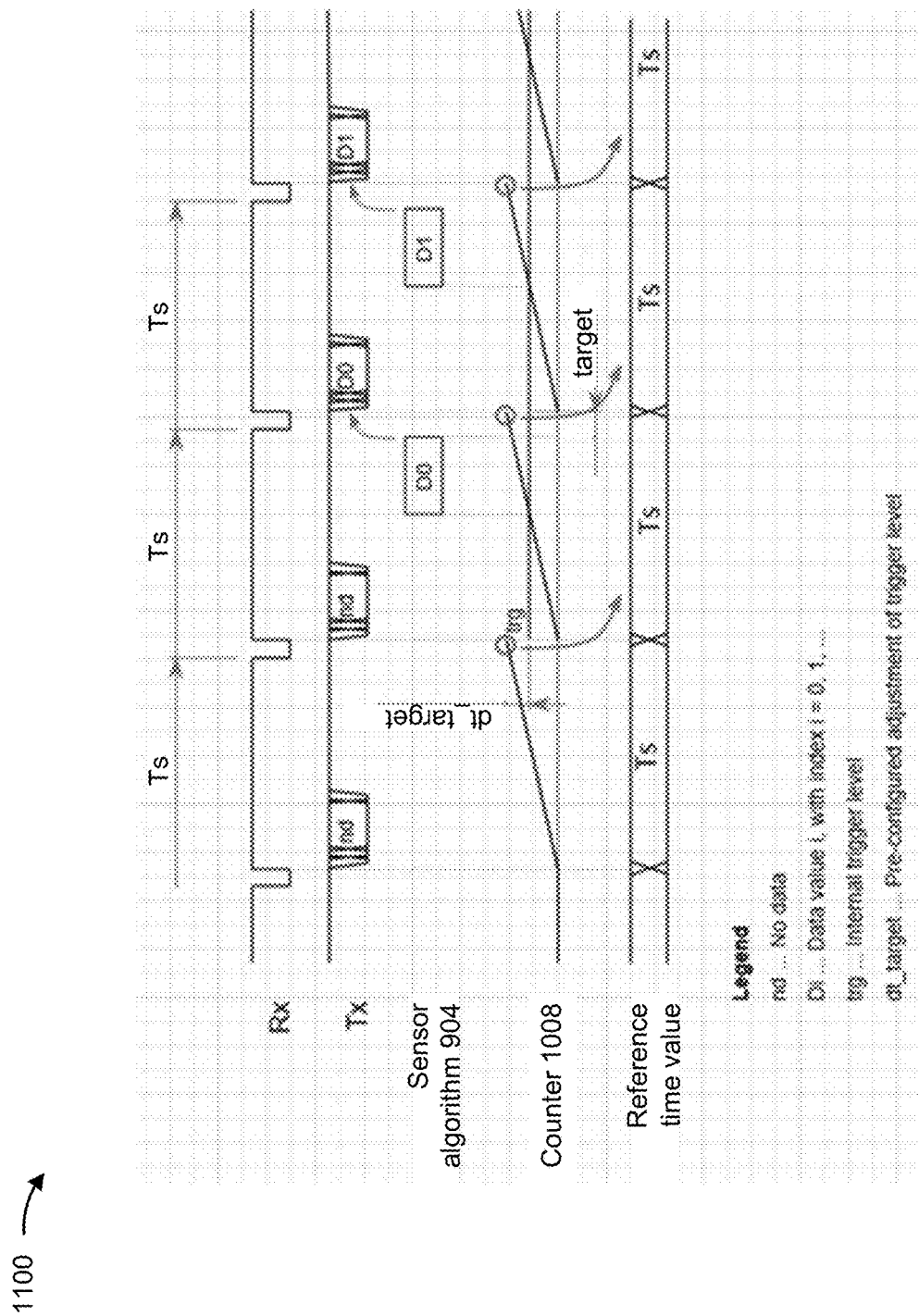
FIG. 11 is a diagram illustrating an example of timing and signal flow for a sensor in a scenario in which a time interval between triggers from an ECU is constant over a period of time.

FIG. 11 is a diagram illustrating an example 1100 of the timing and signal flow associated with operation of the sensor 105 in a scenario in which a time interval between triggers from the ECU 120 is constant over a period of time.

In some implementations, if a rate at which the ECU 120 transmits, and the sensor 105 receives, triggers is constant, then the reference time value remains unchanged over time, and no updates are needed. However, as described above, the rate at which the ECU 120 transmits, and the sensor 105 receives, triggers may vary (e.g., due to a PWM frequency variation or due to variations of a clock reference of the sensor). In some implementations, the sensor 105 may be capable of maintaining synchronization even when the rate at which the ECU 120 transmits, and the sensor 105 receives, triggers varies.

As indicated above, FIG. 11 is provided as an example. Other examples may differ from what is described with regard to FIG. 11.

Figure 12:
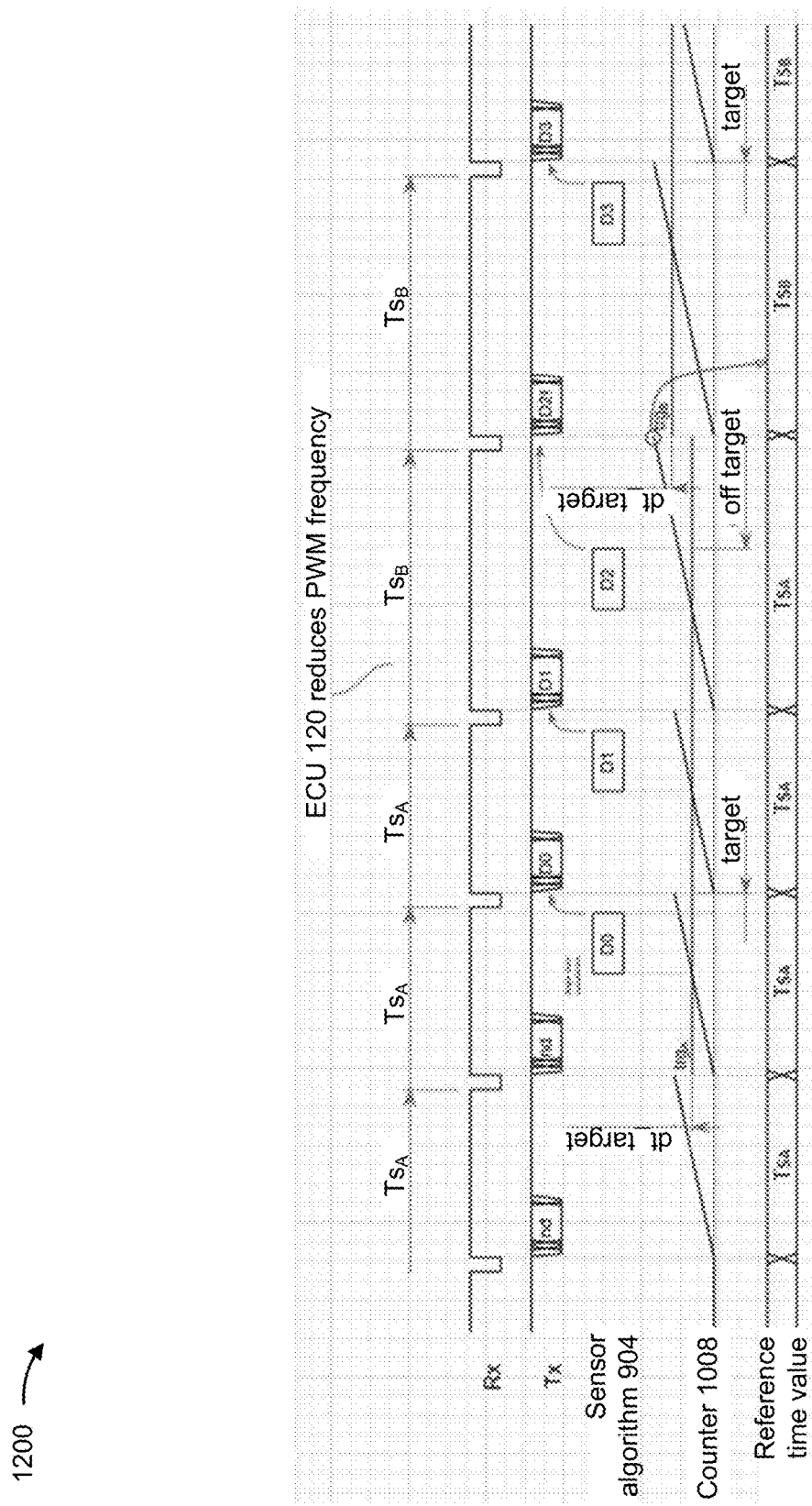
FIG. 12 is a diagram illustrating an example of timing and signal flow associated with operation of a sensor in a scenario in which an ECU decreases a PWM frequency.

One scenario in which the rate of the triggers varies is when the ECU 120 decreases a PWM frequency. FIG. 12 is a diagram illustrating an example 1200 of the timing and signal flow associated with operation of the sensor 105 in a scenario in which the ECU 120 decreases a PWM frequency. In the example shown in FIG. 12, the ECU 120 is to decrease the PWM frequency from $fs_A$ to $fs_B$ during operation of the sensor 105 in the synchronous mode such that a request period is increased from period $Ts_A$ ($Ts_A=1/fs_A$) to period $Ts_B$ ($Ts_B=1/fs_B$). As further shown, and in accordance with the operation described above with respect to FIGS. 9 and 10, the sensor algorithm 904 calculates the sensor data D2 when a value of the counter 1008 reaches a first internal trigger level value $trg_A$. The internal trigger level value $trg_A$ is an internal trigger level value determined while the period between triggers is the period $Ts_A$. As indicated in FIG. 12, a result of the PWM frequency decrease is that the sensor data D2 is out of synchronization with the next received trigger by some finite amount of delay. In some implementations, the sensor 105 may include an indication that the trigger was received off target in the data frame (indicated by the "!" in FIG. 12). Further, the sensor 105 can indicate the delay in the data frame to, for example, enable the ECU 120 to perform latency compensation as described above. In a case in which the PWM frequency decrease was initiated by the ECU, the ECU has knowledge of the additional delay (i.e., the delay difference from the target value). The additional delay is the difference of the trigger periods before and after the PWM frequency change. Thus, even if the sensor does not explicitly transmit an indication of the delay difference from the target value, the ECU is able to compensate for the latency. As further shown, after the cycle associated with the sensor data D2, the sensor 105 updates the reference distance value based on the corresponding period $Ts_B$, and the internal trigger level value is updated such that the internal trigger level value $trg_B$ is used to trigger the sensor algorithm 904. In this way, synchronization to the trigger pulses of the ECU 120 can be restored, and a next item of sensor data D3 will be on time.

As indicated above, FIG. 12 is provided as an example. Other examples may differ from what is described with regard to FIG. 12.

Figure 13:
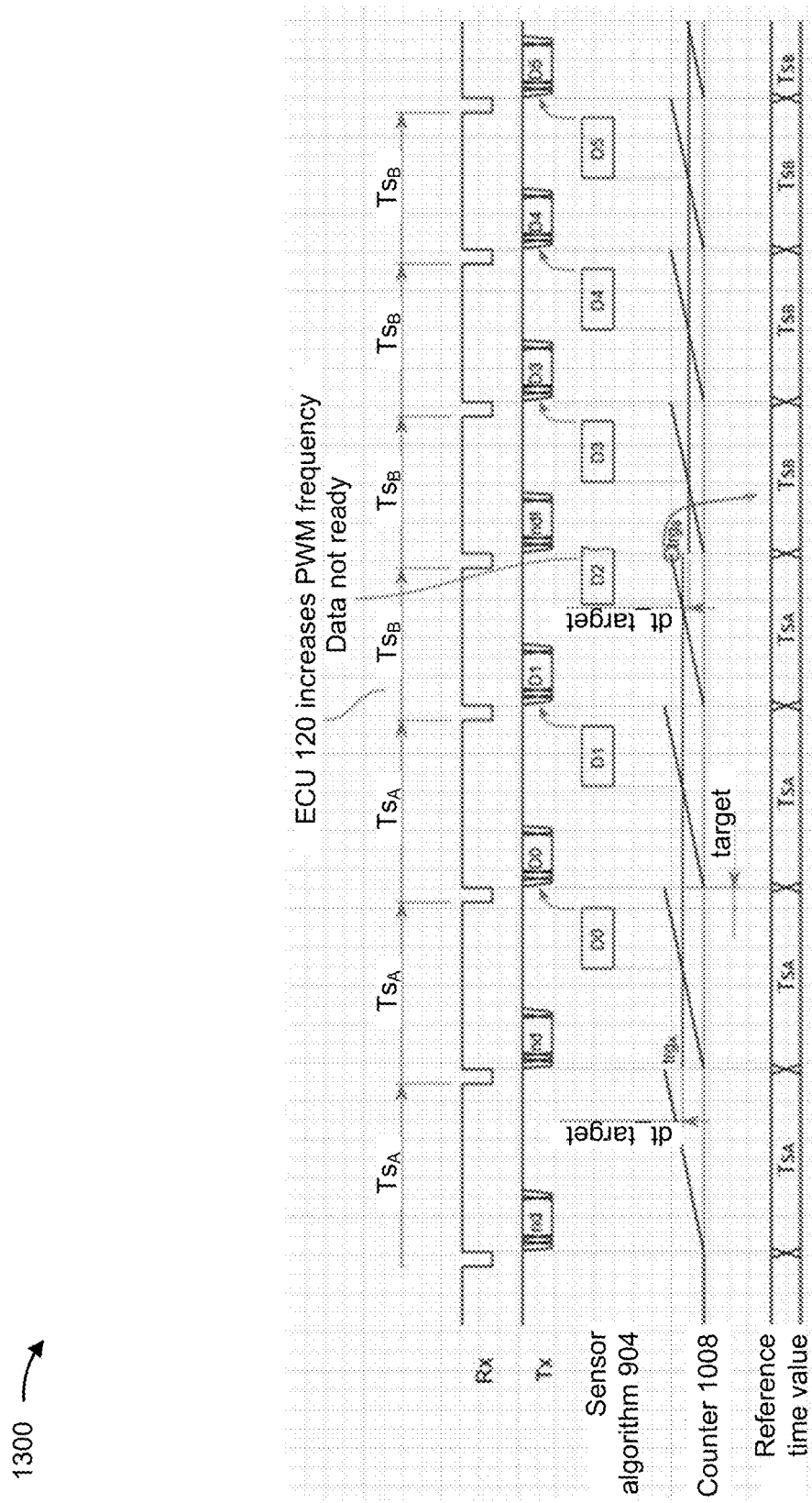
FIG. 13 is a diagram illustrating an example of the timing and signal flow associated with operation of a sensor in a scenario in which an ECU increases a PWM frequency.

Another scenario in which the rate of the triggers changes is when the ECU 120 increases a PWM frequency. FIG. 13 is a diagram illustrating an example 1300 of timing and signal flow associated with operation of the sensor 105 in a scenario in which the ECU 120 increases a PWM frequency. In the example shown in FIG. 13, the ECU 120 is to increase the PWM frequency from $fs_A$ to $fs_B$ during operation of the sensor 105 in the synchronous mode such that a request period is decreased from period $Ts_A$ ($Ts_A=1/fs_A$) to period $Ts_B$ ($Ts_B=1/fs_B$). As further shown, and in accordance with the operation described above with respect to FIGS. 9 and 10, the sensor algorithm 904 calculates the sensor data D2 when a value of the counter 1008 reaches a first internal trigger level value $trg_A$. The internal trigger level value $trg_A$ is an internal trigger level value determined while the period between triggers is the period $Ts_A$. As indicated in FIG. 13, a result of the PWM frequency increase is that the sensor data D2 is not ready for transmission when the next trigger is received from the ECU 120. In some implementations, the sensor 105 may transmit, in the data frame, an indication that the sensor data was not ready, and that the data frame does not include sensor data (indicated by the "nd!" in FIG. 13). As further shown, after the cycle associated with the sensor data D2, the sensor 105 updates the reference distance value based on the corresponding period $Ts_B$, and the internal trigger level value is updated such that the internal trigger level value $trg_B$ is used to trigger the sensor algorithm 904. In this way, synchronization to the trigger pulses of the ECU 120 can be restored, and a next item of sensor data D3 will be on time.

As indicated above, FIG. 13 is provided as an example. Other examples may differ from what is described with regard to FIG. 13.

Notably, in example 1300, the ECU 120 "misses" one sensor data value as a result of increasing the PWM frequency. In some applications, missing a sensor data value is undesirable. For example, in an electric main drive of a vehicle, the PWM frequency is increased when accelerating (i.e., when a high torque is generated). Under such conditions, missing a sensor data value is undesirable because of a consequent reduction in energy efficiency. Thus, in some implementations, the ECU 120 may be configured to prevent a sensor data value from being missed as result of an increase in the PWM frequency.

In some implementations, rather than increasing the PWM frequency from a current PWM frequency to a target PWM frequency, which leads to missed sensor data, the ECU 120 may temporarily increase the PWM frequency to twice the target PWM frequency for two triggers, after which the ECU 120 may decrease the PWM frequency to the target PWM frequency. In this way, the sensor 105 may transmit, and the ECU 120 may receive, sensor data values needed by the ECU 120 (i.e., such that no sensor data values are missed).

Figure 14:
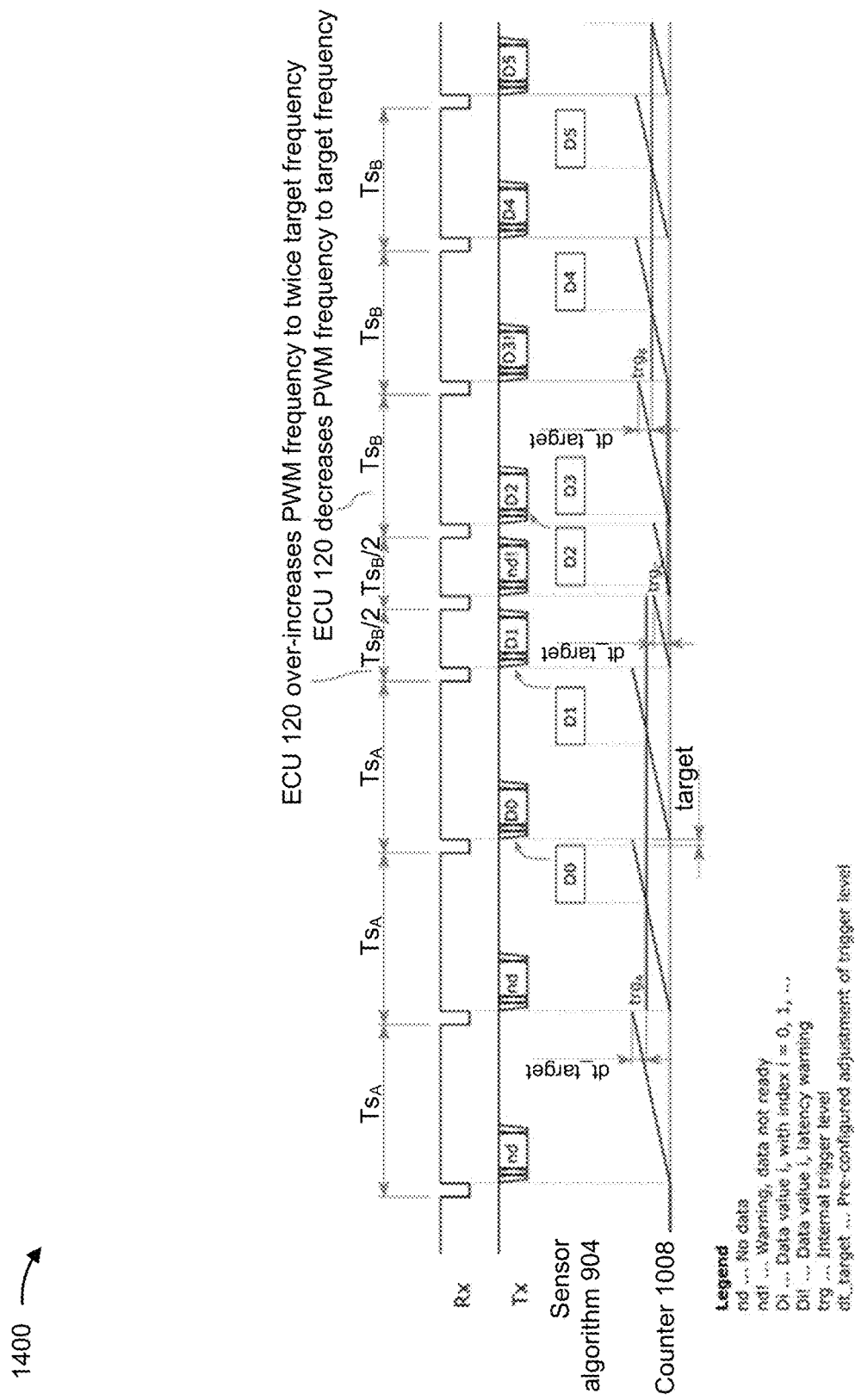
FIG. 14 is a diagram illustrating an example of timing and signal flow associated with operation of a sensor in a scenario in which an ECU temporarily increases a PWM frequency to twice a target frequency.

FIG. 14 is a diagram illustrating an example 1400 of the timing and signal flow associated with operation of the sensor 105 in a scenario in which the ECU 120 temporarily increases a PWM frequency to twice a target frequency. In the example shown in FIG. 14, the ECU 120 is to increase the PWM frequency from $fs_A$ to $fs_B$ during operation of the sensor 105 in the synchronous mode such that a time interval between triggers is decreased from period $Ts_A$ ($Ts_A=1/fs_A$) to period $Ts_B$ ($Ts_B=1/fs_B$). As shown in FIG. 14, rather than changing the PWM frequency from PWM frequency $fs_A$ directly to PWM frequency $fs_B$, which would result in a missed sensor data value (as illustrated in example 1300), the ECU 120 changes the PWM frequency temporarily to twice the target frequency (e.g., to 2*$fs_B$, such that the period between triggers is a period $Ts_B/2$). Here, the sensor 105 cannot provide the sensor data value associated with a next trigger (e.g., a trigger received at a time $Ts_B/2$ after the PWM frequency increase) because the sensor data is not ready. As further shown, the sensor 105 updates the reference distance value based on the corresponding period 2*$Ts_B$, and the internal trigger level value is updated such that the internal trigger level value $trg_C$ is used to trigger the sensor algorithm 904. Here, the ECU 120 expects to receive a "data not ready" warning in response to the first trigger after the PWM frequency increase and can discard the data frame accordingly (e.g., since the ECU 120 does not need the sensor data value at time $Ts_B/2$ after the PWM frequency increase). Since the sensor 105 adapts the internal trigger level value, the sensor 105 expects another trigger at a time 2*$Ts_B/2$ after the PWM frequency increase, and prepares and transmits the sensor data D2 accordingly.

Next, after the ECU 120 transmits the second trigger (e.g., at the time 2*$Ts_B/2$ after the PWM frequency increase), the ECU 120 reduces the PWM frequency to the target frequency $fs_B$ (e.g., such that the time interval between triggers is period $1/TS_B$). Here, due to the PWM frequency decrease from 2*$fs_B$ to $fs_B$, a next sensor data value D3 transmitted by the sensor 105 will show an increased latency (e.g., since the set of sensor tasks is triggered based on internal trigger level value $trg_C$). However, this latency can be indicated and compensated for as described above for the case of the ECU 120 decreasing the PWM frequency. After the cycle associated with the sensor data D3, the sensor 105 updates the reference distance value based on the corresponding period $Ts_B$, and the internal trigger level value is updated such that the internal trigger level value $trg_B$ is used to trigger the sensor algorithm 904. In this way, synchronization to the trigger pulses of the ECU 120 can be restored, and a next item of sensor data D4 will be on time.

As indicated above, FIG. 14 is provided as an example. Other examples may differ from what is described with regard to FIG. 14.

Figure 15:
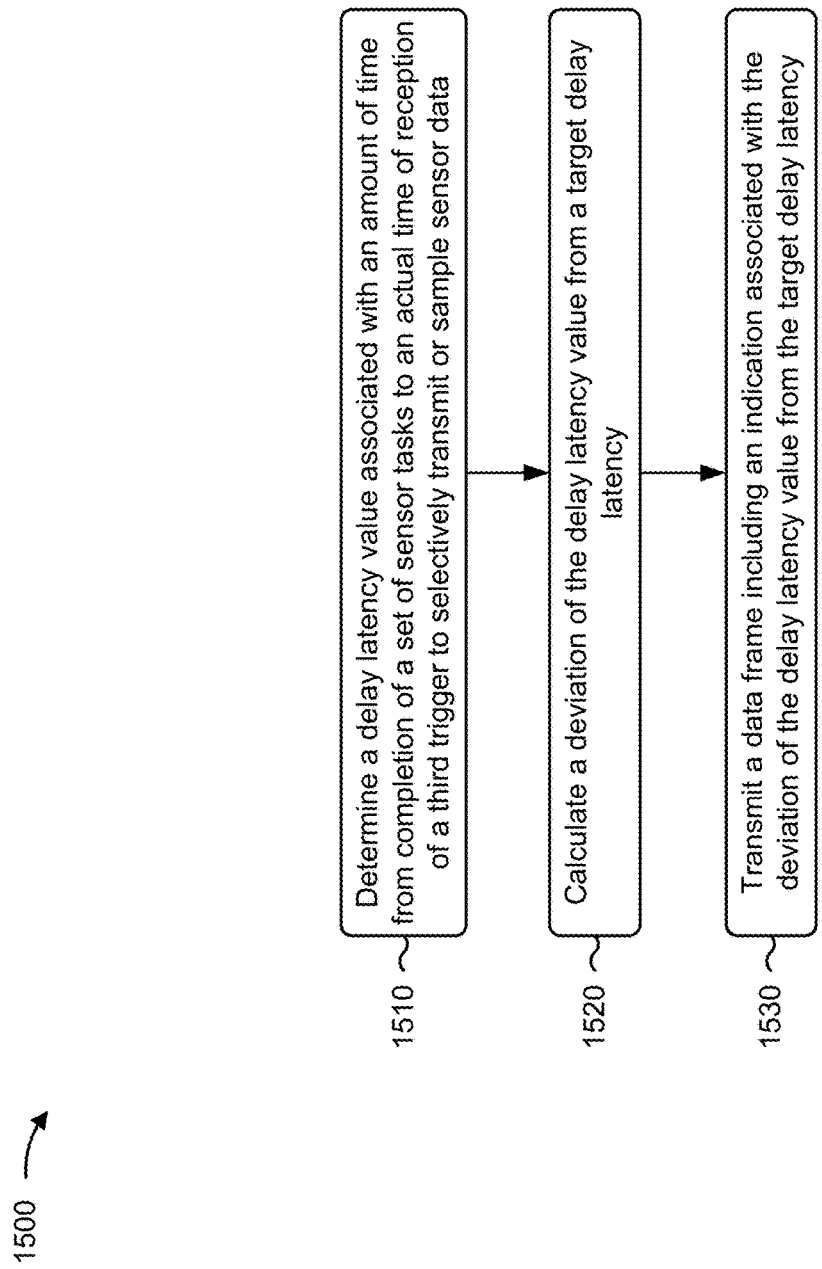
FIGS. 15 and 16 are flowcharts of example processes associated with operation of a sensor described herein.

FIG. 15 is a flowchart of an example process 1500 associated with operation of a sensor described herein. In some implementations, one or more process blocks of FIG. 15 may be performed by a sensor (e.g., sensor 105).

As shown in FIG. 15, process 1500 may include determining a delay latency value associated with an amount of time from completion of a set of sensor tasks to an actual time of reception of a trigger to selectively transmit or sample sensor data (block 1510). For example, the sensor may determine a delay latency value associated with an amount of time from completion of a set of sensor tasks to an actual time of reception of a trigger to selectively transmit or sample sensor data. For example, in some implementations, the trigger may cause the sensor to either transmit previously sampled sensor data (e.g., on a bus). As another example, in some implementations, the trigger may cause the sensor to sample sensor data.

As further shown in FIG. 15, process 1500 may include calculating a deviation of the delay latency value from a target delay latency (block 1520). For example, the sensor may calculate a deviation of the delay latency value from a target delay latency, as described above.

As further shown in FIG. 15, process 1500 may include transmitting a data frame including an indication associated with the deviation of the delay latency value from the target delay latency (block 1530). For example, the sensor may transmit a data frame including an indication associated with the deviation of the delay latency value from the target delay latency, as described above.

Process 1500 may include additional implementations, such as any single implementation or any combination of implementations described below and/or in connection with one or more other processes described elsewhere herein.

In a first implementation, process 1500 includes adjusting timing of initiation of the set of sensor tasks based on a determination that the deviation satisfies a threshold.

In a second implementation, alone or in combination with the first implementation, the timing is adjusted in association with adapting to a variation of a PWM frequency associated with operation of the sensor.

In a third implementation, alone or in combination with any of the first and second implementations, process 1500 includes determining that the delay latency value satisfies a delay latency high threshold, and transmitting the data frame comprises transmitting the indication to indicate that the sensor data is expired.

In a fourth implementation, alone or in combination with any of the first through third implementations, process 1500 includes determining that the delay latency value satisfies a delay latency low threshold, and transmitting the data frame comprises transmitting the indication to indicate that the sensor data is not ready.

In a fifth implementation, alone or in combination with any of the first through fourth implementations, the indication associated with the deviation of the delay latency value from the target delay latency includes latency compensation information to be used for compensating for the deviation.

Although FIG. 15 shows example blocks of process 1500, in some implementations, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
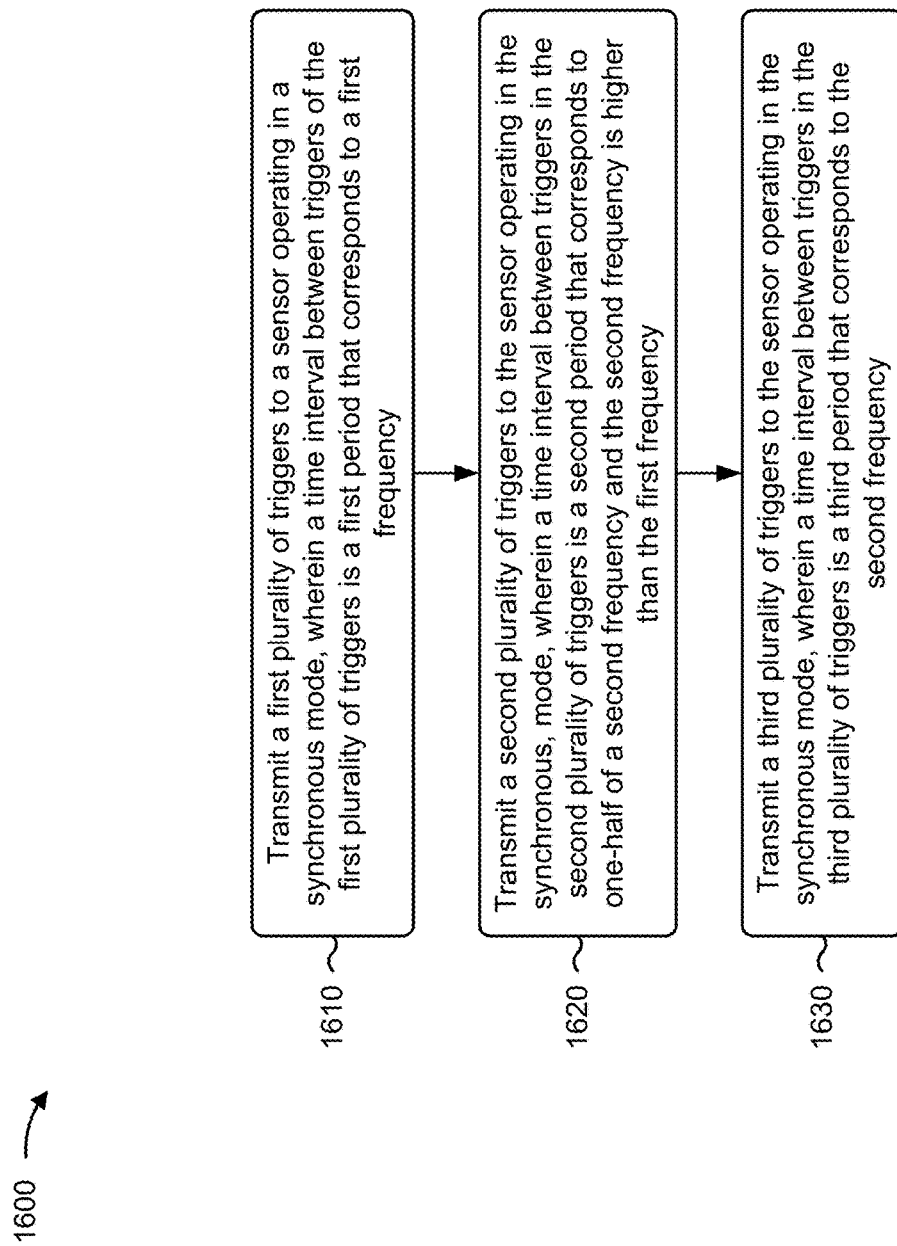

FIG. 16 is a flowchart of an example process 1600 associated with adaptation to a pulse width modulation frequency variation for a sensor operating in a synchronous mode. In some implementations, one or more process blocks of FIG. 16 are performed by an ECU (e.g., ECU 120).

As shown in FIG. 16, process 1600 may include transmitting a first plurality of triggers to a sensor operating in a synchronous mode, wherein a time interval between triggers of the first plurality of triggers is a first period that corresponds to a first frequency (block 1610). For example, the ECU may transmit a first plurality of triggers to a sensor operating in a synchronous mode (e.g., a sensor 105), wherein a time interval between triggers of the first plurality of triggers is a first period that corresponds to a first frequency, as described above.

As further shown in FIG. 16, process 1600 may include transmitting a second plurality of triggers to the sensor operating in the synchronous mode, wherein a time interval between triggers in the second plurality of triggers is a second period that corresponds to one-half of a second frequency and the second frequency is higher than the first frequency (block 1620). For example, the ECU may transmit a second plurality of triggers to the sensor operating in the synchronous mode, wherein a time interval between triggers in the second plurality of triggers is a second period that corresponds to one-half of a second frequency and the second frequency is higher than the first frequency, as described above.

As further shown in FIG. 16, process 1600 may include transmitting a third plurality of triggers to the sensor operating in the synchronous mode, wherein a time interval between triggers in the third plurality of triggers is a third period that corresponds to the second frequency (block 1630). For example, the ECU may transmit a third plurality of triggers to the sensor operating in the synchronous mode, wherein a time interval between triggers in the third plurality of triggers is a third period that corresponds to the second frequency, as described above.

Process 1600 may include additional implementations, such as any single implementation or any combination of implementations described below and/or in connection with one or more other processes described elsewhere herein.

Although FIG. 16 shows example blocks of process 1600, in some implementations, process 1600 includes additional blocks, fewer blocks, different blocks, or differently arranged blocks than those depicted in FIG. 16. Additionally, or alternatively, two or more of the blocks of process 1600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value or its corresponding absolute value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A sensor, comprising:
   one or more components configured to:
      determine a time interval between a time of reception of a first trigger to selectively transmit or sample first sensor data and a time of reception of a second trigger to selectively transmit or sample second sensor data;
      determine, based on the time interval, a predicted time of reception of a third trigger to selectively transmit or sample third sensor data;
      initiate a set of sensor tasks based on the predicted time of reception of the third trigger, the set of sensor tasks being initiated to cause the third sensor data to be ready for transmission at the predicted time of reception of the third trigger;
      receive the third trigger;
      determine a delay latency value associated with an amount of time from completion of the set of sensor tasks to an actual time of reception of the third trigger;
      calculate a deviation of the delay latency value from a target delay latency; and
      transmit a data frame including an indication associated with the deviation of the delay latency value from the target delay latency.

2. The sensor of claim 1, wherein the one or more components are further configured to:
   determine whether the deviation of the delay latency value from the target delay latency satisfies a sample adjustment threshold, and
   adjust a sampling time point associated with a next initiation of the set of sensor tasks based on a determination that the deviation satisfies the sample adjustment threshold.

3. The sensor of claim 2, wherein the sampling time point is adjusted in association with adapting to an increase of a pulse width modulation (PWM) frequency associated with operation of the sensor.

4. The sensor of claim 2, wherein the sampling time point is adjusted in association with adapting to a decrease of a pulse width modulation (PWM) frequency associated with operation of the sensor.

5. The sensor of claim 1, wherein the one or more components are further configured to:
   determine whether the delay latency value satisfies a delay latency high threshold, and
   wherein the one or more components, when transmitting the data frame, are configured to:
      transmit the third sensor data, and transmit the indication to indicate that the third sensor data is expired based on the delay latency value satisfying the delay latency high threshold.

6. The sensor of claim 1, wherein the one or more components are further configured to:
   determine whether the delay latency value satisfies a delay latency low threshold, and
   wherein the one or more components, when transmitting the data frame, are configured to:
      transmit the indication to indicate that the third sensor data is not ready based on the delay latency value satisfying the delay latency low threshold.

7. The sensor of claim 1, wherein the indication associated with the deviation of the delay latency value from the target delay latency includes latency compensation information to be used for compensating for the deviation.

* * * * *